No. 673,010. Patented Apr. 30, 1901.
H. ROSENTHAL.
KETTLE COVER.
(Application filed Apr. 14, 1900.)
(No Model.)
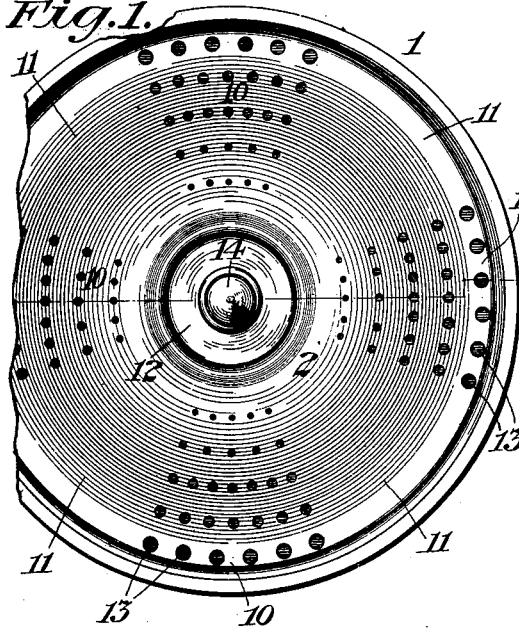
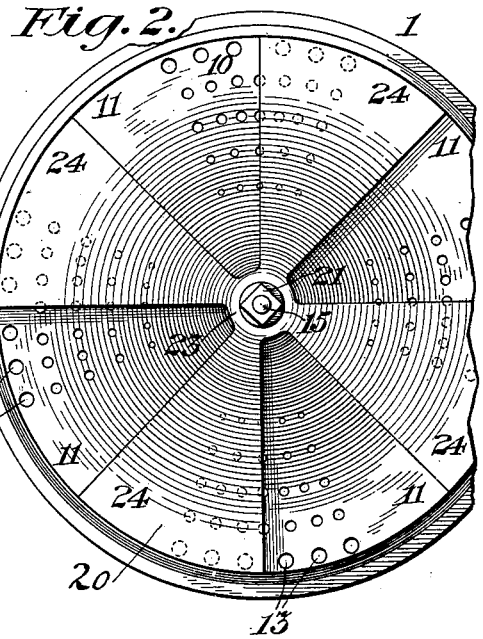
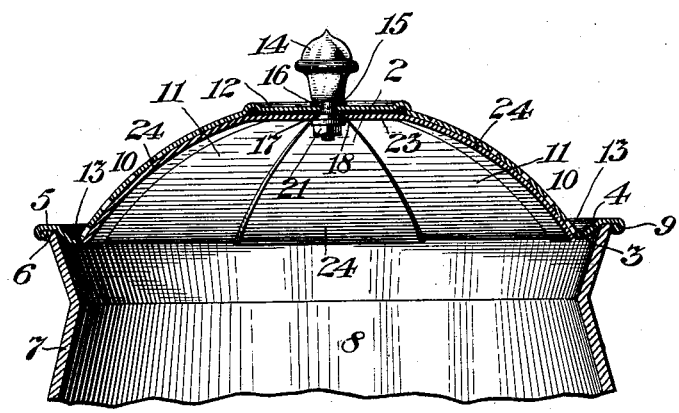
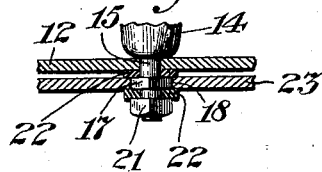
Witnesses:
Inventor
Herman Rosenthal,
By his Attorney
THE NORRIS PETERS CO., PHOTO-LITHO., WASHINGTON, D. C.

UNITED STATES PATENT OFFICE.

HERMAN ROSENTHAL, OF NEW YORK, N. Y.

KETTLE-COVER.

SPECIFICATION forming part of Letters Patent No. 673,010, dated April 30, 1901.

Application filed April 14, 1900. Serial No. 12,837. (No model.)

*To all whom it may concern:*

Be it known that I, HERMAN ROSENTHAL, a citizen of the United States, residing at New York, in the county and State of New York, have invented certain new and useful Improvements in Kettle-Covers, of which the following is a specification.

This invention relates to covers for kettles or cooking utensils; and it has for its object to provide a simple and improved cover of this class which can be inexpensively manufactured and which will effectively operate to confine the odors resultant from cooking and at the same time permit the escape of the steam generated and enable the regulation of the steam-escape, which will be adapted to regulate the degree of internal heat or temperature within the kettle in the operation of cooking, and which can be conveniently operated in the purpose for which it is intended.

In the drawings, Figure 1 is a top or plan view of a kettle-cover embodying my improvements. Fig. 2 is an inverted top or plan view of the same. Fig. 3 is a transverse sectional view. Fig. 4 is a detail sectional view.

Corresponding parts in all the figures are denoted by the same numerals of reference.

Referring to the drawings, 1 designates the body of the cover, which is usually circular or disk-shaped and which is preferably of concavo-convex form in cross-section, whereby the cover forms an interior dome or chamber, as at 2, which provides a space for the concentration of the steam or vapors in operation. The body portion 1 of the cover is surrounded by an edge flange 3, which comprises an upwardly and outwardly projecting portion 4, from the top edge of which projects a lateral or horizontal flange 5, which forms a rest or support upon the top edge 6 of the sides 7 of the kettle or cooking vessel 8, as shown in Fig. 3 of the drawings. The construction and arrangement of the angular edge portion, as just described in connection with the concavo-convex contour of the body 1, thus results in the edge portion of the body of the cover projecting well down within the neck edge of the kettle or vessel, whereby the operative efficiency of the device is enhanced.

In practice the cover, consisting of its body portion 1 and the angularly-flanged edge portion 3, is preferably constructed of a single sheet of metal, which may be suitably stamped into shape, and the extreme outer edge at the perimeter is turned inwardly and upwardly to form an edge bead, as at 9, whereby the supporting-flange 5 is strengthened and the top edge 6 of the sides of the kettle or vessel are retained between said bead and the downwardly-extending flange portion 4, as represented in the sectional view Fig. 3.

The body portion 1 of the cover is provided with a plurality of sets of perforations, said sets being represented at 10, the cover having solid or imperforate spaces or portions, as represented at 11, between said sets of perforations 10. These sets of perforations extend radially with respect to the center of the body portion 1 and extend outwardly to the angular edge flange portion 4, the perforations being preferably arranged, as shown, so that the series "spreads" and covers an approximately V-shaped space. The central portion of the part 1 is preferably solid or imperforate, as at 12, to form a central plane surface within the converging inner ends of the respective sets of perforations 10. The outermost perforations of the sets 10 are preferably of larger diameter than the inner perforations of the set, especially those perforations which are at or adjacent to the vertex of the angle formed by the outer edge of the concavo-convex body portion 1 and the angular flange portion 4, as represented at 13, whereby a more effective operation is insured, inasmuch as the dome space for the steam or vapor is more contracted at the outer or edge portion of the cover. The "spreading" or outwardly-enlarging arrangement of the sets of perforations also facilitates the operation in respect to the more contracted outer portion of the dome space for the steam or vapor, inasmuch as the number of perforations thereby increase outwardly with relation to the cover.

14 designates a knob or handle which is provided centrally with relation to the plane-surface central space 12 and projects above the same, whereby the cover may be conveniently manipulated. Said knob is carried upon a cylindrical stem 15, which is rotatable in a corresponding cylindrical bearing-opening 16, formed through the cover-body 1, which stem projects interiorly with relation to the body 1 and is provided upon its projecting end with an angular portion 17, which is received by a corresponding angular opening 18 in a closure disk or plate 20, the purpose of which will be hereinafter described, said closure-plate being secured detachably in connection with the handle-stem 15 by means of a nut 21 or other suitable fastening or securing device mounted upon the lower end of the stem, suitable washers being preferably interposed, as at 22.

The closure disk or plate 20 preferably consists of sheet metal and is of concavo-convex contour, so that it corresponds to the interior face of the cover-body 1 and occupies a parallel position with relation thereto, and it comprises a central plate or body portion 23, which operates under the central imperforate portion 12 of the body 1, from which plate 23 radiate wings 24, corresponding in number and contour to the respective sets of perforations 10, said wings being therefore outwardly spreading or of approximately V shape. By turning the knob 15 the wings 24 may be caused to entirely or partly close the respective sets of perforations or to leave the latter entirely open, in which latter position the wings will rest under the solid or imperforate intervening portions or spaces 11 of the body-cover 1.

The operation and advantages of my invention will be readily understood by those skilled in the art to which it appertains. The improved cover provides a simple and durable device which is adapted for effective use in connection with various forms or types of kettles or cooking utensils. When the closure portion or disk is turned so as to leave the respective sets of perforations 10 entirely open, the steam or vapors of cooking are permitted to escape freely through said perforations, while the operation of said closure-plate to only partially close the sets of perforations will regulate the escape of steam or vapors and also accordingly regulate the degree of internal heat or temperature within the vessel, this regulation being dependent simply upon the number of perforations or openings which are open or closed. This convenient provision for the regulation of the escape of the steam and cooking vapors enables a generally more perfect operation in the process of cooking, the avoidance of odor when desired, and the prevention of rising of the cover by steam-pressure.

Having thus described my invention, I claim and desire to secure by Letters Patent—

1. An improved cover for kettles or cooking utensils, comprising a body member of concavo-convex form to provide an interior dome-chamber or steam-space for the cooking utensil and provided with annularly-arranged sets or series of perforations or openings extending radially, the perforations or openings increasing in size outwardly in each of the sets or series, and closure means conforming to the curvature of the body member and whereby the perforations or openings may be entirely or partially closed.

2. The herein-described improved cover, for kettles or cooking utensils, comprising a body member provided with sets or series of perforations or openings extending radially and having solid or imperforate portions intermediately of said sets or series, the outermost of said openings being larger than the innermost thereof and said body member being provided with a surrounding edge flange extending upwardly and outwardly and being of concavo-convex form in cross-section, a closure-plate turnable with respect to said body and of corresponding concavo-convex contour and embodying radial wings corresponding to the sets or series of perforations in the body and adapted to partially or entirely close the same, and a knob projecting with respect to cover-body and operatively connected with said closure-plate to turn the same.

In testimony whereof I have signed my name in the presence of the subscribing witnesses.

HERMAN ROSENTHAL.

Witnesses:
J. R. LITTELL,
LENA BARRETT.